June 11, 1974  W. S. LUSBY  3,816,610

PALATABLE FOAMED RODENT CONTROL MATERIAL

Filed Jan. 6, 1972

United States Patent Office 3,816,610
Patented June 11, 1974

3,816,610
PALATABLE FOAMED RODENT CONTROL MATERIAL
Walter S. Lusby, Pittsburgh, Pa., assignor to Westinghouse Electric Corporation, Pittsburgh, Pa.
Continuation-in-part of abandoned application Ser. No. 819,140, Apr. 25, 1969. This application Jan. 6, 1972, Ser. No. 215,748
Int. Cl. A01m 1/20; A01n 17/14; B27k 5/00
U.S. Cl. 424—17       2 Claims

ABSTRACT OF THE DISCLOSURE

A rodent control material comprising a rodent control agent, such as rodenticide, interdispersed throughout a plastic foam cellular structure is made by admixing chemical ingredients capable of forming a solid resinous cellular mass with a liquid or solid rodenticide in an amount effective to kill rodents.

CROSS REFERENCE TO RELATED APPLICATIONS

This application is a continuation-in-part of pending application U.S. Ser. No. 819,140, filed on Apr. 25, 1969, now abandoned.

BACKGROUND OF THE INVENTION

This invention relates to a palatable cellular foamed plastic rodent control material.

Rodent control is an ancient problem reaching back to prehistoric times. Even today, there is a national problem of rat control, particularly in hard core low income urban areas, which has reached such proportions that the Congress of the United States has initiated direct action to combat it. Rat proofing is an urgent need for preventing rats from running in and out of living and sleeping areas. The presently continuing problem indicates that more effective control methods are needed.

Certain methods of rodent control which have been considered effective under controlled conditions in rural areas, such as an anticoagulant type of rodenticide in loose grain bait, are considered dangerous and ineffective in crowded urban areas. Although rodenticides are often placed in closed bait containers, as a safety precaution, the labor and material cost are considerably increased by this practice. Present techniques of rat proofing also have a high labor content, for example, the pounding of hardware cloth into holes and covering with cement or concrete.

Foams, in unpalatable form and containing no rodenticide have been taught as a rodent control material, in U.S. 3,473,252, and used to envelop the rodent and cause death by asphyxiation, nitrogen gas being used to inflate the cells of the foam. Such a rodent control method would, however, entail use of tremendous amounts of rodent control material to foam the rodent in place in their burrows with consequent high cost.

SUMMARY OF THE INVENTION

Accordingly, it is an object of this invention to disclose a new, improved and inexpensive palatable rodent control material having a rodent control agent interdispersed throughout a plastic foam cellular structure.

Another object of this invention is to provide methods of making such foamed rodent control materials.

Briefly, the present invention accomplishes the above cited objects by mixing a two stream composition, for example, an isocyanate batch and a masterbatch containing polyol, catalyst, blowing agent and a rodent control agent. The rodent control agent can be a solid or liquid rodenticide, such as an anticoagulant or acute poison, rodent bait, or mixtures thereof. Generally, the rodenticide and rodent bait will be used together in effective amounts as a rodent control agent. This two stream composition containing the rodent control agent, could then be foamed in place. This would produce a plastic foam having interdispersed therethrough a rodent control agent. In the case where a solid rodenticide is used it would be interdispersed within the foam cell walls. Where a liquid rodenticide is used it would be very finely interdispersed generally as a film coating the cell walls and within the resin of the cell walls.

The mixture would be used, for example, to fill holes through which rats are accustomed to run or to provide more or less permanent bait stations near established or potential rat runways. The two stream liquid constituents, when added together, would react chemically and expand up to 50 or more times in volume by foaming action. The low density mass would fill up cavities, take their shape and quickly become rigid. In those cases where a bait was incorporated into the foam pest control material, the rat, finding its customary path closed, would typically eat his way through the foam thereby poisoning himself and bringing on his death. Alternately, the rat would be attracted by bait and ingest the rodenticide.

Besides costing only 32 to 35 cents per pound (for a cost of one cent a volume of polyurethane rodent control material approximately 2" x 2" x 7" can be obtained), this invention eliminates the danger of loose material, can be applied to be out of the traffic pattern of children and pets, and provides motivation other than the bait for the rodent to consume the rodenticide. As an additional advantage, the foam plastic rodent control materials generally have excellent weathering qualities and a high factor of fire resistance. The rodent control material of my invention can be used safely in the city by liberally spraying weatherproof bait stations into rodent burrows and harborages and rigidly locking them out of sight and reach of humans and pets.

BRIEF DESCRIPTION OF THE DRAWINGS

For a better understanding of my invention, reference may be had to the accompanying drawings, in which.

DESCRIPTION OF THE PREFERRED EMBODIMENTS

Figure 1:
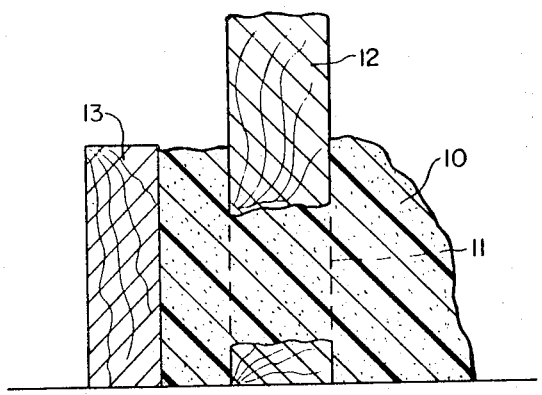
FIG. 1 shows a cross-sectional view of foamed in place rodent control material as used to fill a rat hole in a partition.

Most plastic resins, whether thermoplastic or thermosetting, can be processed into foam form. Basically, plastic foams are materials which by one process or another are given cellular structures which result in densities lower than those of the resins themselves. Though many production methods are known to produce plastic foams, the one that is preferred and particularly suitable for my invention is the use of blowing agents in a foam-in-place process. Foaming-in-place involves pouring a predetermined amount of liquid mix into the cavity to be filled and then foaming the material. Another particularly suitable method, closely allied to the foam-in-place process, is the spray-in-place method, which uses airless or air-atomizing type foam spray equipment.

The category of resins best suitable for my invention are the rigid, foam-in-place types. These include polystyrene formulations, phenolics, silicones and particularly rigid urethanes. The similar characteristic of all these foam materials is that the formulations can be purchased, and the materials foamed or cast to shape by the user. All the resulting foams are rigid. Other type foams can be used however, such as the flexible foam plastics. These would include vinyls, semi-rigid urethanes, and polyethylenes among others.

Of these, urethane foams have been particularly advantageous in accomplishing the object of this invention, due primarily to their being strong and inexpensive.

Urethane foams are produced by the exothermic reaction of a polyisocyanate and a polyhydroxyl-containing compound in the presence of a catalyst, cell control agents and a foaming or blowing agent. The polyhydroxyl compound determines whether the resulting foam will be rigid or flexible, brittle or non-brittle, and the extent of its permeability to gas and moisture and includes polyols, glycols, polyesters, and more generally, polyethers. The isocyanates are the components which tie the polyols into a polymeric structure by the reaction of their terminal NCO groups with the hydroxyl groups of the polyol. Isocyanates are generally made by reaction of an amine, or an amine salt, with phosgene, in the presence of an inert liquid into which they can dissolve. Rigid foamed-in-place urethanes can be produced with densities up to 35 lb./cu. ft. at atmospheric pressure without additional heat and are primarily of closed cell structure. They have excellent strength to weight ratios, good moisture and fungus resistance and exceptional adhesion to wood and primed metal. The most important reactions to form rigid polyurethene foams include:

(1) The urethane reaction

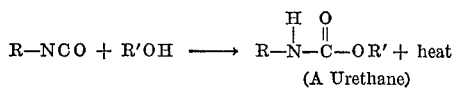
(A Urethane)

and (2) the urea reaction

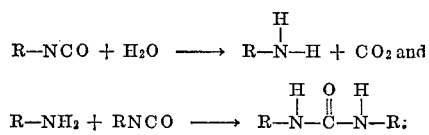

These reactions do not take place in any given order but may occur simultaneously depending on temperature, catalysts and the ratio of the foaming agent. In the above reactions R—NCO is a polyisocyanate such as toluene di-isocyanate or methylene bis (4-phenyl) isocyanate and R'OH is a polyhydroxyl-containing compound, for example, polyols, glycols, polyesters and polyethers. As shown in the Urea reaction, with water in the foaming composition, carbon dioxide is formed, as well as amines. The amines react with more isocyanate to form a urea, and the carbon dioxide expands the foam while the polymeric structure is being formed.

Typical polyisocyanates that may be used in the polyurethane foam pest control material of my invention would include a blend of 80% toluene 2,4-isocyanate and 20% toluene 2,6-di-isocyanate, a blend of 65% of 2,4 and 35% of 2,6-toluene di-isocyanate, 100% toluene 2,4-di-isocyanate, diphenylmethane di-isocyanate, naphthylene di-isocyanate, polyphenyl polyisocyanates, hexamethylene di-isocyanate and triphenylmethane-pp'p''-triyl tri-isocyanate among others.

Examples of blowing agents for polyurethane, include carbon dioxide (produced by the reaction of water and fluorinated aliphatic saturated hydrocarbons such as monofluorotrichloromethane, dichlorodifluoromethane, trichloromonofluoromethane and others.

Catalysts are added to control and accelerate the rate of reaction so that maximum rise is synchronized with gellation to regulate cell size and prevent collapse of the foam. Typical catalysts for polyurethanes could include conventional tertiary amine catalysts such as triethylenediamine, tetramethylbutane diamine, diethylaminoethanol and triethylamine or organic compounds containing tin such as tin hexanoate, tri-n butyltin acetonate, stannous octoate, dibutyl-tin dilaurate and others.

Surfactants aid in the mixing of the foaming ingredients and can be added to regulate the cell structure of the foam. Polyester- and polyether-based rigid foams generally require a surfactant whether they are expanded with carbon dioxide from the water-isocyanate reaction or with an inert blowing agent such as fluorocarbon. The surfactants that can be used include co-polymers based on dimethyl polysiloxane and polyoxysiloxanes among others. Some of these silicones are prepared with ethylene oxide while others are made with ethylene and propylene oxides.

Polhydroxyl materials for Urethane foams include castor oil and its derivatives, polyesters and polyethers. Hydroxyl-terminated polyesters having an equivalent weight of about 125 produce rigid foams with a high percentage of closed cells and high strength properties. Several types of polyethers are available for preparing rigid urethane foams. These polyethers are propylene oxide adducts of many different materials including sorbitol, sucrose, aromatics, diamines, pentaerythritol, phenol-formaldehyde condensates, and methyl glucocide.

Rigid polyurethane foams are well known in the art and reference may be made to U.S. Pats. 3,145,185 and 3,212,652 and Bender, *Handbook of Foamed Plastics*, Lake Pub. Co., 1965, pp. 13 and 125–148, herein incorporated by reference, for more detailed forming and fabrication information. Bender (p. 13) also gives detailed information on methods of foaming, and blowing agents that can be used with styrene, vinyl, phenolic, silicone, epoxy and other foams useful in the materials of this invention.

A commonly employed and highly effective class of rodenticides are the solid or liquid anticoagulants (warfarin, etc.) which are poisons which cause death by internal hemorrhage. They generally require consumption by rats for 5 days to 2 weeks to achieve a lethal effect by hindering the coagulation or clotting of blood. This creates a safety factor for humans and pets and precludes the development of bait shyness in the rat populations. By incorporating the bait and anticoagulant in effective amounts into foam plastics, there rodenticides can be used in the city with greater safety. Rodenticides that are known to be highly effective such as the sodium salt of 3-a-acetonyl-furfuryl-4-hydroxycoumarin (Fumarin), and 3-a-acetonylbenzyl-4-hydroxycoumarin (warfarin anticoagulants) have been tested in experimental foams with palatable baits such as coarsely ground grain. At present, a combination of sugar and dried blood seems to be among the more satisfactory baits from all standpoints, such as cost, effectiveness, lack of objectionable odor, and compatibility with foam. An acute, specific poison rodenticide—Norbormide— has also been demonstrated to be very compatible with plastic foams. This material is selectively toxic to Norway rats and could play an important role in urban rat control.

Figure 2:
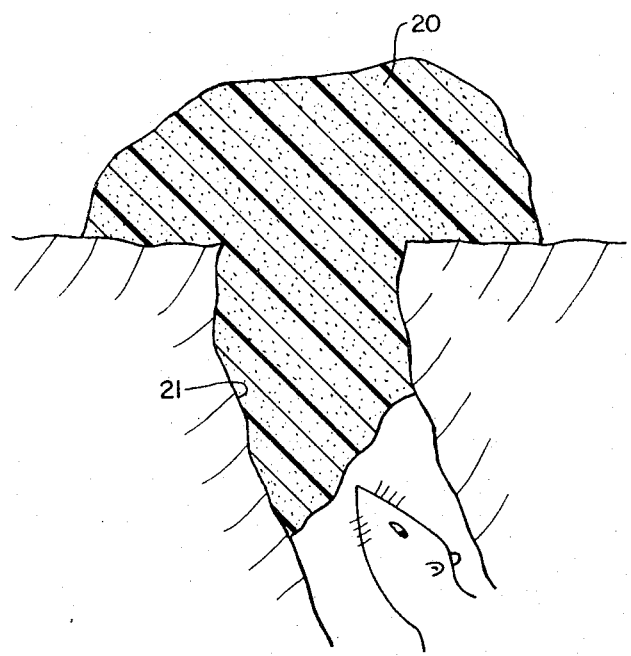
FIG. 2 shows another embodiment of this invention for use in a rodent burrow.

Referring now to FIG. 1, foamed-in-place pest control material 10 is shown closing a rat hole 11 in a partition 12. Such foam control material can be formed by adding isocyanate to a composition of polyol, surfactant, catalyst, blowing agent, and liquid or solid rodenticide. The reactants will then expand and can be foamed-into-place against a form 13 which can later be removed. FIG. 2 shows the use of foamed-in-place pest control material 20 for use in a rodent burrow 21. These figures show the foamed-in-place rigid polyurethane preferred embodiment of this invention.

The following examples through specifically covering rigid foamed-in-place polyurethanes should in no way be considered limiting, as the use of rodenticides with or on baits in or on palatable foamed plastic is considered to be within the scope of this invention. Such other foamed plastics, such as polystyrenes, phenolic vinyls, epoxies, polyethylenes and silicones among others, are well known in the art as are their methods or preparation. (See *Materials and Methods Manual* No. 127, "Foam Plastics," June *1954*, pages 143–158, and

*Materials In Design Engineering*, "Plastic Foam," May 1966, pages 87–102 herein incorporated by reference.)

EXAMPLE 1

A plastic foam rodent control material was made as follows: 110.2 parts of a crude blend of 80% toluene, 2,4-di-isocyanate and 20% toluene, 2,6-di-isocyanate (sold under the tradename Nacconate 4040 by National Analine Division of Allied Chemical Corp.) was added to a container of well stirred ingredients:

100.0 parts of a polyoxypropylene derivative of pentaerythritol (sold under the tradename PEP 550 by Wyandotte Chemical Corp.);
50.0 parts coarsely ground grain containing .025 percent solid warfarin rodenticide (3-a-acetonylbenzyl-4-hydroxycourmarin);
2.0 parts water;
0.2 part stannous octoate;
3.0 parts silicon surfactant; and
2.0 parts of a triethylenediamine and alkanolamine catalyst blend (sold under the tradename R–8020 by Houdry Process and Chemical Co.).

After 15 seconds the mixture turned from dark to light brown. After allowing 1 minute for the reaction to start the foam rising, the mixture was poured into a large container where it expanded about 30 times. The resulting foam plastic had good cell size, evidencing good blowing even with the grain-rodenticide filler, and a tough skin that proved quite flexible. This material was also foamed in place in a well established rat runway gnawed through a floor board taken from a chicken coop. The foam pest control material expanded into and filled the opening completely, adhering very well to the wood and conforming to the geometry of the hole.

EXAMPLE 2

A plastic foam rodent control material was made as in Example 1 except that 50 parts dried blood and sugar (1 to 1 ratio) and 20 parts of a 14% sodium salt of 3-acetonylfurfuryl-4-hydroxycourmarin solid, rodenticide was substituted for the grain-warfarin combination of Example 1.

After allowing 1 minute for the foam to start to rise, the mixture was poured into a larger container where it expanded about 30 times. The resulting foam plastic took the bait-rodenticide constituents very well with no noticeable degrading, and it was felt to be an excellent combination for foaming-in-place to fill holes and burrows. It was felt that much higher amounts of bait-rodenticide constituents could have been used.

EXAMPLE 3

A plastic foam pest control material was made as in Example 1 except that trichlorofluoromethane was used as the blowing agent instead of water. The resulting mixture was also foamed-in-place in a gnawed through floor board. The foam material expanded into and filled the opening completely adhering very well to the wood and conforming to the geometry of the hole.

The one-shot foaming system used in the examples had two components—the polyisocyanate and the masterbatch of polyol plus catalyst, surfactant and blowing agent. The approximate ratio of isocyanate component to polyol component should be about 1 to 1. The maximum exothermic temperature developed in the foam was approximately about 400° F. The range of mixing times was about 1 minute and the range of foam times was about 2 minutes.

Any method whereby chemical ingredients are added to form a resinous composition with interdispersed rodent control agent (rodenticide, and bait generally in mixture), capable of forming a solid cellular plastic foam structure is considered within the scope of this invention.

Although the examples concentrate on the one shot pour or foam-in-place method of forming the cellular foam, the spray-in-place method and continuous pouring to form slabs of plastic foam with rodent agent ingredients interdispersed throughout the cellular structure could be used. In continuous slab production, the chemical components of the foam are delivered at fixed rates through a mixing head onto a moving conveyor in parallel ribbons. Adjustable sideboards and the conveyor belt form a continuous mold in which the liquid mix foams. The foamed slab then passes through a series of auxiliary equipment which may include cutoff saws, vertical trimmers and slicing machines. The cellular rodent control material of this invention could easily be made by this method to produce slabs of foamed plastic with interdispersed pest control agents. The sliced foam product in block or other form could then be used to fill rat holes and rodent burrows.

As mentioned, spray coating, especially of rigid polyurethane foamed rodent control material, is of special interest. The urethane adheres well to most materials, will generally expanded to a final thickness of 2 to 3 inches on flat surfaces and the foamed material can be sprayed into holes and burrows quite easily.

Beside the one-shot mixing technique, others such as prepolymer, semi-polymer and frothing techniques can be used to form the cellular rodent control materials of this invention. In the prepolymer technique of making urethane foams, a polyhydroxy compound is reacted with an excess of polyisocyanate to produce an isocyanate terminated prepolymer, the prepolymer is reacted with water in the presence of a catalyst and a surface active agent to produce a foam. In the semi-polymer technique, about 20% of the polyol to be used is prereacted with all the isocyanate. The resulting material contains approximately 30% free isocyanate groups. Foam is made by reacting this prepolymer with a masterbatch that contains the remainder of the polyol, catalyst surface active agent, blowing agent, modifiers and additives as for example the pest control agents aforementioned. In the one shot process for foaming rigid polyurethane foams, all the foaming ingredients are mixed in one step and allowed to react. A frothing or pre-expansion system for making rigid flexible urethane foams also is available. The frothing process involves adding additional blowing agent under pressure to the liquid one-shot foam mix just prior to dispensing the foam. All these processes, techniques and methods are used commercially and are well known in the art.

It is foreseeable that a compact dispensing machine could be used to mix the isocyanate with the other ingredients to provide a quick, effective and efficient way to fill holes and burrows with my foam rodent control material. The examples demonstrate that it is possible to add chemicals and bait useful in rat control to foamed plastics, while retaining the desired physical features of foaming, cavity filling, and rigidizing.

More than a score of various formulations of these foamed plastic rodent control materials have been experimentally exposed to rats. These experiments have included both individual caged wild Norway rats and established colonies of wild Norway rats. These experiments have confirmed the effectiveness of this invention in killing rats.

I claim:
1. In the method of destroying a rodent in a confined habitat by filling the accessible openings which lead into the confined habitat of the rodent, including holes in buildings which are suspected of harboning rodents, with an amount of a hardenable synthetic resin foam sufficient to substantially fill and harden to block said openings, the improvement consisting of the step of blocking said openings with a solid rigid celluar foamed plastic composition containing amounts of interdispersed rodent bait and rodent poison effective to poison a rodent typically eating his way through the platable baited rigid foamed plastic blocking its customary path.

2. A pre-formed and pre-cut palatable baited block of hardened solid rigid cellular foamed polyurethane plastic containing amounts of interdispersed rodent bait and rodent poison effective to poison a rodent eating his way through the palatable baited block.

References Cited

UNITED STATES PATENTS

| | | | |
|---|---|---|---|
| 3,473,252 | 10/1969 | Kramer et al. | 43—124 |
| 3,127,312 | 3/1964 | Boyer | 424—78 X |
| 3,105,321 | 10/1963 | Link | 424—17 |

OTHER REFERENCES

Zatsepin, Chem. Abst. 69, 2628x (1968), "Development of a Baitless Method of Rat Extermination in the Form of Poisonous Foam."

SHEP K. ROSE, Primary Examiner

U.S. Cl. X.R.

43—124, 131; 52—309, 517, 743; 424—78, 84, 281